Nov. 12, 1968 G. MARTELLI ET AL 3,410,437
TRAYS OR THE LIKE FOR PACKING AND CARRYING FRUIT OR
LIKE ARTICLES OF ROUNDED SHAPE
Filed June 26, 1967 4 Sheets-Sheet 1

INVENTORS
GUIDO MARTELLI
NERIO MARTELLI
BY FRANCESCO MARTELLI

ATTORNEYS

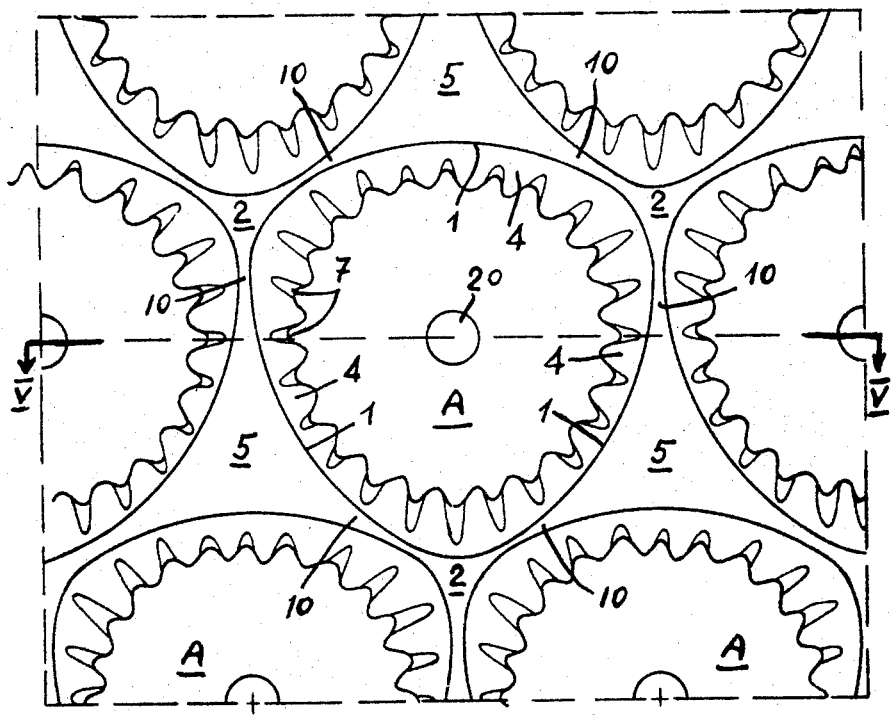
Fig. 4
Fig. 5
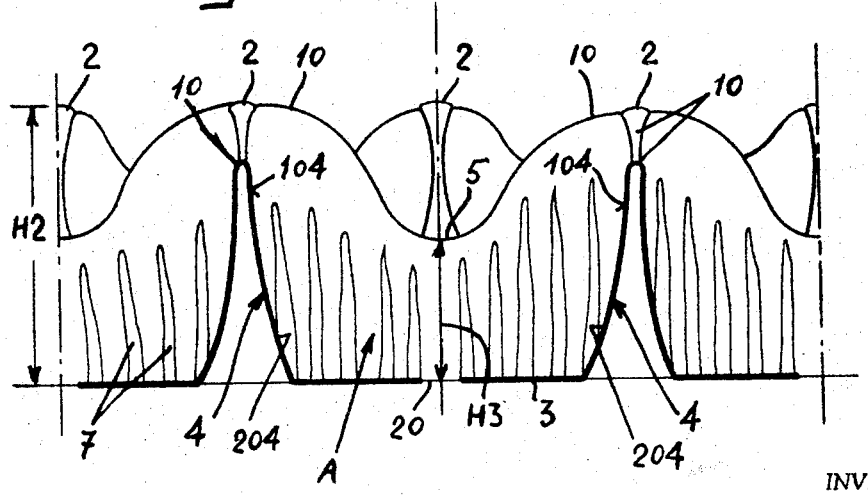

INVENTORS
GUIDO MARTELLI
NERIO MARTELLI
BY FRANCESCO MARTELLI

Imirie & Smiley
ATTORNEYS

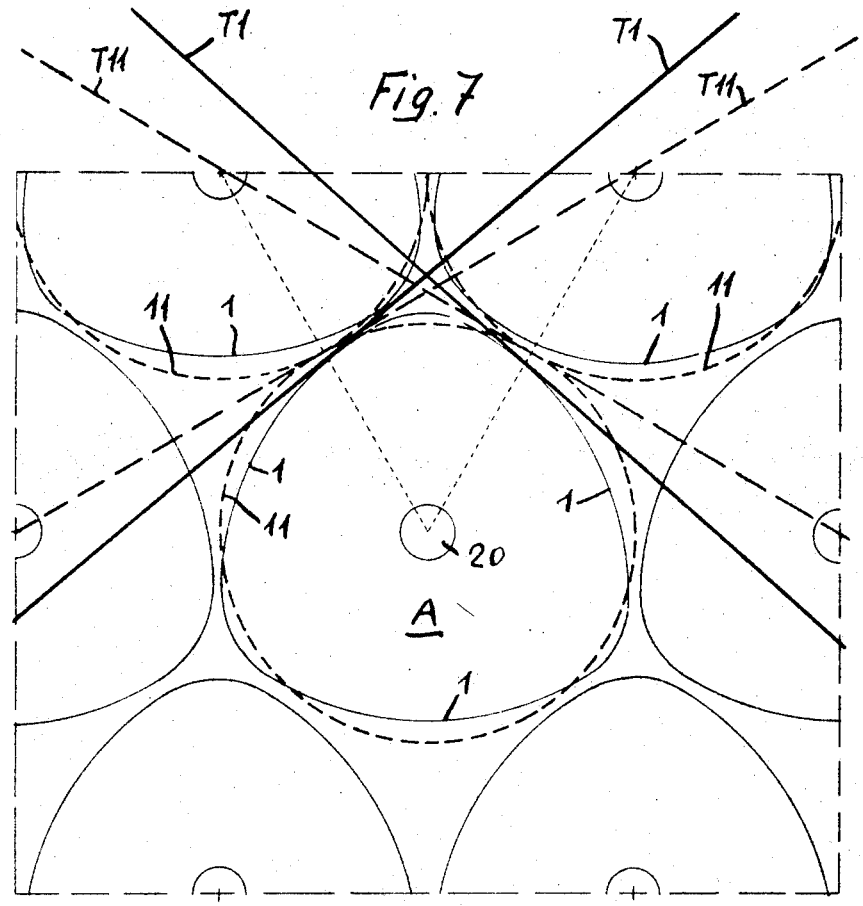
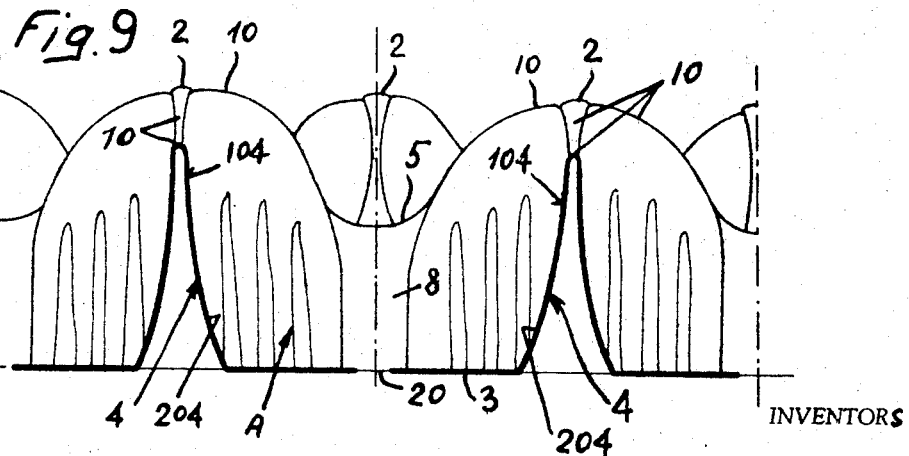

United States Patent Office 3,410,437
Patented Nov. 12, 1968

3,410,437
TRAYS OR THE LIKE FOR PACKING AND CARRYING FRUIT OR LIKE ARTICLES OF ROUNDED SHAPE
Guido Martelli, Nerio Martelli, and Francesco Martelli, all of 17 Via Calanco, Bologna, Italy
Filed June 26, 1967, Ser. No. 648,835
11 Claims. (Cl. 217—26.5)

ABSTRACT OF THE DISCLOSURE

Fruit packing tray of thermoplastic foil 0.1 to 0.3 mm. thick with fruit cells having triangular upper rims and nontriangular bases, the cell walls merging gradually over the heighth from triangular to nontriangular shape, the inscribing circle of the triangular top having preferably a radius $R_1$ greater than the largest fruit radius $R_2$, the ratio $R_2/R_1$ preferably being between 1.0 and 1.5.

BACKGROUND OF THE INVENTION (1) *Field of the invention*

This invention relates to improvements in trays or the like for packing and cartage or shipment of fruit or like articles of rounded shape, and more particularly to such trays of yielding synthetic plastic material preferably thermoplastic foil of a thickness of approximately 0.1 to 0.3 mm. and which are of cellular construction.

(2) *Description of the prior art*

In known trays of this kind the resilience or elastic deformability of the cells may assist in gently gripping the fruit in the cells, and thus rocking and jumping the fruit in the cells during transport may be prevented.

In the known trays each cell has an upper rim approximately circular in plan, or very close to circular, e.g., oval or polygonal and in particular twelve-sided, which corresponds to the shape of the cell base, the lateral cell wall being of approximately frusto-conical or ball cup form. The desired gripping action on the fruit in the cells may be obtained with reliability only for such fruits as differ in size or shape in a relatively slight degree from a nominal shape or size matching the cells.

The main object of the present invention is to provide a tray of the said type in which a gentle but secure clamping of the fruits in the cells is obtained even for greater deviations from the nominal shape or size of the fruits and enables the fruits to be easily inserted into the cells; this is important particularly when using automatic filling and packaging machines. At the same time, with optimum use of the available surface of the tray, it should be possible to produce the trays without difficulty by the suction die method, specifically without counter-rams of extruded plastic foils with unidirectionally positioned molecules and/or of thermoplastic foils whose melting point lies very close to the softening point, e.g. polystyrene foils.

SUMMARY

According to the present invention, a fruit or like tray of the kind set forth has the inner top rim of each cell of approximately triangular shape in plan, the base of the cell having a nontriangular form, e.g., circular or oval, and the lateral cell wall gradually passes, seen in cross sections parallel to the cell base, from the triangular form in the upper portion of the cell, downwardly to that of the cell base.

BRIEF DESCRIPTION OF THE DRAWINGS

In order that the invention may be more fully understood some embodiments in accordance therewith will now be described by way of example with reference to the accompanying drawings, in which:

FIG. 4 shows a plan section of a tray;

FIG. 5 is a partial vertical cross-section along the line V—V of FIG. 4;

FIG. 7 shows diagrammatically in plan the gripping action on the fruit in a cell;

FIG. 9 is a partial vertical cross-section along the line IX—IX of FIG. 8.

DESCRIPTION OF THE PREFERRED EMBODIMENT

Figure 1:
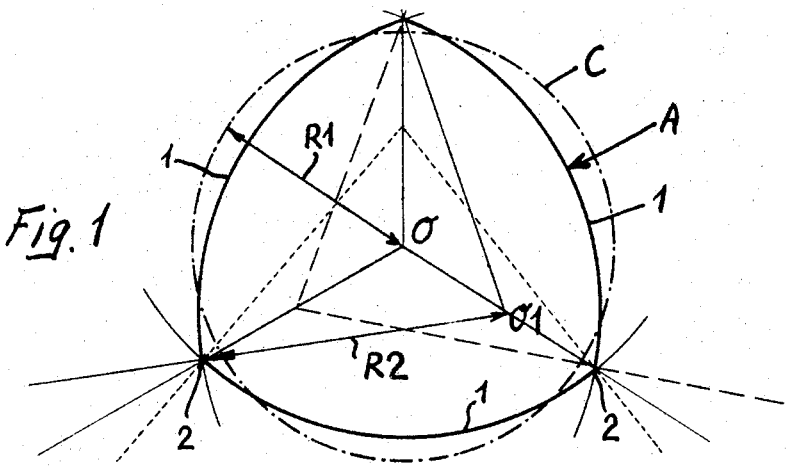
FIGS. 1 and 2 show diagrammatically in plan a cell of a fruit or like tray.
Figure 2:
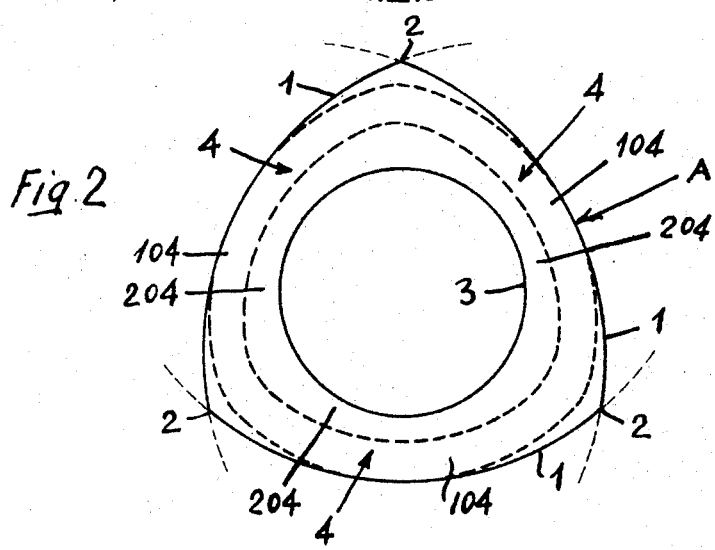

FIGS. 1 and 2 show a single cell A of a fruit or like tray of the aforesaid kind having cells and made of yielding or resilient synthetic plastic material, for packaging and transporting fruit or the like of rounded shape. The inner top rim of this cell A has an approximately triangular shape in plan view with arc-shaped outwardly convex sides 1, whereas the cell base 3 is circular. In particular, each side 1 of the approximately triangular plan form of the inner top rim of the cell consists of the arc of a circle which has a centre $O_1$ offset from the centre O of the cell base 3 and a greater radius $R_2$ than the radius $R_1$ of the largest cross-sectional circle C of the fruit F which is to be inserted into the cell A.

In cross-sections taken parallel to the cell base 3, the lateral cell wall 4 varies gradually in cross-section changing from the triangular form of the inner top rim of the cell to the circular form of the cell base 3. Two cross-sections of the lateral cell wall 4 situated at different heights from the cell base 3 are shown in broken lines in FIG. 2. The sidewall 4 of the cell A consists of three part areas 104 corresponding in shape to that of say the envelope of a cone frustum or ball cup, each area 104 being positioned in the region of a side 1 of the approximately triangular plan form of the inner top rim of the rim, i.e,. each extending along a sector angle of approximately 120° and merging into each other in the region of the corner points of the triangular shape. The radius of curvature of these partial areas 104 is substantially greater than the radius $R_1$ of the largest cross-sectional circle C of the fruit F to be inserted into the cell. In the lower cell portion 204, the sidewall of the cell A is approximately frusto-conical or ball cup or socket shaped, i e., in cross-sections extending parallel to the cell base 3, it has an approximately circular cross-section of diameter diminishing gradually from the top to the bottom.

The ratio $R_2/R_1$ between the radius $R_2$ of the arc-shaped sides 1 of the triangular plan form of the inner top rim of the cell and the radius $R_1$ of the largest cross-sectional circle C of the fruit F to be inserted into the cell, determines the curvature of the triangle sides 1. In the extreme case where $R_2=R_1$, the inner top rim of the cell would assume the form of a circle corresponding to the largest cross-sectional circle C of the fruit. If, on the other hand, the radius $R_2$ is large in comparison with $R_1$, the sides 1 of the triangular plan form of the inner top rim of the cell are flattened and assume an approproximately rectilinear line. This extreme case is shown diagrammatically in FIG. 3, in which the triangular plan view form of the inner top rim of the cell has rectilinear sides 1 connected to each other at the corners by arcs 101.

Substantial flattening of the sides 1 of the triangular plan form of the inner top rim of the cell facilitates the production of the tray by the suction mould process but considerably reduces the capacity of the cell A. By contrast, an excessive curvature of the said triangle sides 1 does not provide secure gripping of the fruit in the cell A where the fruit shapes or sizes differ considerably from the normal values. An appropriate compromise solution satisfactorily allowing for both requirements, resides in choosing a value of between 1 and 1.5 for the ratio $R_2/R_1$.

Figure 3:
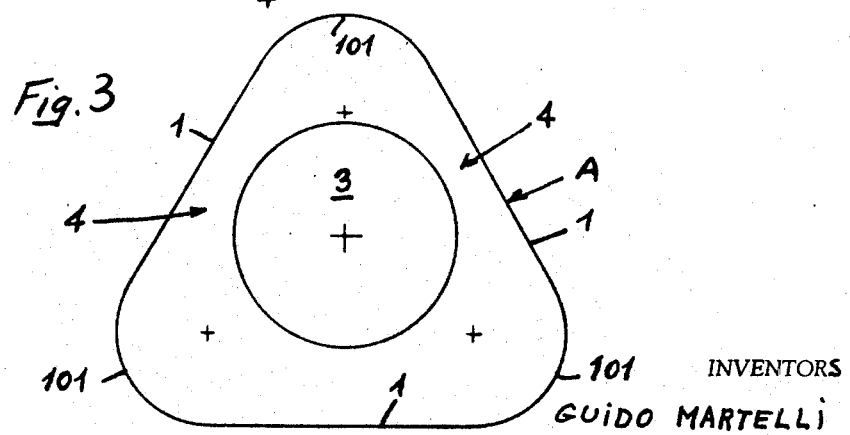
FIG. 3 shows diagrammatically in plan another fruit tray cell.

In the cells in FIGS. 1 to 3, the plan of the inner top rim of the cell is an equilateral triangle and the sides 1 of the triangle are of identical curvature. It is quite possible however for the sides 1 of triangular plan of the inner top rim of the cell to be of different lengths and/or of different curvature.

FIGS. 4 and 5 show a cellular tray for packaging and transport of rounded fruits or like articles which are made according to the fundamental idea shown in FIGS. 1 and 2. This tray consists of resilient synthetic plastic material, especially of foil thickness, i.e., of a thickness of approximately 0.1 to 0.3 mm. and preferably thermoplastic, and is produced by the suction mould process. The edge of the opening, i.e., the inner top rim of each cell A of this tray is of approximately triangular form in plan, with arcuate sides 1 which are outwardly convex and connected to each other at the corners of the triangle. Each cell A consists of a depression which is surrounded by three hollow humps 2 spaced from each other at the corner points of the approximately triangular plan of the inner top rim of the cell. The individual cells A of the supporting plate are arranged in staggered parallel rows. The humps 2 are of approximately triangular cross-section and are situated in the gaps between the individual cells A, so that they fill these gaps and in each instance delimit three adjacent cells A.

Figure 6:
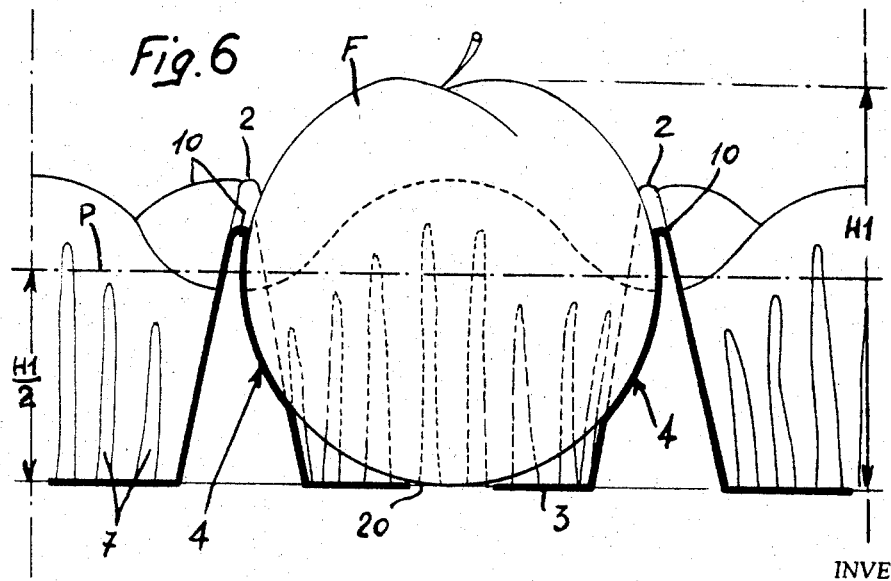
FIG. 6 shows a partial vertical cross-section of the cell according to FIGS. 4 and 5 with a fruit gripped therein.

The height $H_2$ of each hump 2 from the base 3 of the cell is considerably smaller than the height $H_1$ of the fruit F inserted into the cell A, but greater than the height $$\frac{H_1}{2}$$

of the plane P, containing the largest cross-section C of the fruit, as seen in FIGS. 5 and 6. In the drawings, all three humps 2 arranged around a cell A are of the same height. It is quite possible however to position humps 2 of different height around each cell A.

In the planes of cross-sections extending parallel to the cell base 3, each hump 2 is of approximately triangular cross-section with arcuate sides convex towards the interior or the hump. In the upper portion of each hump 2, the cross-sectional shape of the humps approximately corresponds to the form of a three-pointed star. The upper extremity of each hump 2 may have a plane termination. The upper extremity of each hump 2 is preferably downwardly or upwardly convex or so shaped that it has greater rigidity than the other cell wall 4. A further reinforcement may be provided where the upper extremity of the humps 2 has a greater wall thickness than the remaining cell wall 4.

Three hollow webs 10 start from the upper extremity of each hump 2, which are of progressively diminishing height and correspondingly increasing width, and in plan bounded by the two adjacent sides 1 of the triangular plan form of two contiguous cells A. In elevation, each web 10 or ridge may be of optional outline adapted to the prevailing requirements. If a tray is to be formed for example, in which the fruits in the cells A are separated completely from each other, the elevational configuration of the webs or ridges 10 should be chosen so that, at least in the region in which two fruits in adjacent cells A would be in contact with each other, the height of the webs or ridges 10 is greater than the height $$\frac{H_1}{2}$$

of the plane P containing the greatest cross-section C of the fruits F. In this case, a hollow, i.e., double-walled, web or ridge 10 is interposed in each instance between two adjacent fruits, which prevents mutual contact between the fruits. If better ventilation of the fruits is considered to be of greater value however, the elevational configuration of the webs or ridges 10 may drop away from the corresponding hump 2 with a greater slope.

Three saddles 5 of substantially lower height are situated between the humps 2, around each cell A. The webs or ridges 10 starting from the upper extremities of the humps 2 merge into these saddles 5. Each saddle has an approximately triangular form in cross-section, with arcuate sides convex towards the interior of the saddle, and is bounded by the sides of the approximately triangular plan form of the inner rim of the three adjacent cells A. The arrangement is such that each side 1 of the approximately triangular top rim of the cell has a convex-concave outline in elevation, i.e. an outline with a median concave portion corresponding to a saddle 5 and a convex portion to either side of the same, as apparent from FIG. 5 in particular. The convex portions of the elevational outline of each side 1 of the approximately triangular top rim of the cell then corresponds to the crests of the two webs or ridges 10 starting from the corresponding saddle 5 and merging into the humps 2 at the extremities of the side 1 of the triangle. The saddles thus represent the lowest points of the cell rim which is approximately triangular in cross-section, whereas the humps 2 represent the highest points of this cell rim at the corners of its triangular plan form. The smallest height $H_3$ of the outer rim of the saddles 5 is a little smaller or greater than the height $$\frac{H_1}{2}$$

of the plane P containing the largest cross-section C of the fruit 5 inserted into the cell A, or is approximately equal to this height $$\frac{H_1}{2}$$

The upper bounding portion of each saddle may be approximately flat, or it may be reinforced, like the upper extremities of the humps 2, by inwardly or outwardly directed convexities and/or by greater wall thickness than that of the remaining cell wall.

The cell base 3 may be circular or oval, or have an approximately circular polygonal form. The base surface of the cell is preferably made flat, but may be concave or convex, or partially concave and partially convex. The cell base 3 may moreover be reinforced by optionally formed and extending projections and/or depressions, e.g., extending concentrically or radially, or by greater wall thickness compared to the lateral cell wall 4. It is possible moreover to form at least one ventilation hole 20, e.g., centrally, in the cell base 3.

Compared with the top rim of the cell or the humps 2 and saddles 5 around the cell, the lateral cell wall 4 has greater resiliency or deformability, owing to the form of the cell as well as to the deliberate reinforcement of the humps and saddles. The lateral wall 4 preferably has approximately vertical corrugations 7, ripples, grooves or the like, which on the one hand reinforce the cell wall 4 in the vertical direction and consequently prevent vertical squashing of the cell during insertion of the fruit, and on the other hand enhance the elasticity and expansibility of the cell A in the transverse direction.

Whilst inserting and lightly pressing a fruit F into a cell A, the resilient lateral cell wall 4 is deformed elastically and expands in the transverse direction, i.e., parallel to the cell base 3, at the same time assuming an approximately spherical shape corresponding to the surface of the fruit in the region of its contact areas with the inserted fruit F, as seen, e.g., in FIG. 6. A corresponding deformation also affects the top rim of the cell. The inserted fruit F is gently but firmly gripped in the cell A, that is to say in the vertical direction, i.e., parallel to the median axis of the cell, as well as in the horizontal direction, i.e., parallel to the cell base 3. The vertical gripping action is based on the lateral transverse expansion of the cell A obtained by the greater elastic deformability of the cell wall 4 in the region of the greatest fruit cross-section C below the reinforced upper extremities of the humps 2 around the cell A (FIG. 6).

The horizontal gripping action is to be described with reference to FIG. 7 in which, and in plan view, a solid line 1 shows the approximately triangular top rim of an empty cell A, and a dotted line 11 shows the top rim of a full cell after insertion of the fruit. $T_1$ and $T_{11}$ mark the tangents to the top rim 1 of an empty cell or to the top rim 111 of a full cell at the points of contact or at the points of the shortest mutual distance between the fruits of adjacent cells. As long as the cell A is empty, the two corresponding tangents $T_1$ subtend an angle, e.g., smaller than 120°. On inserting the fruit, the cell A is enlarged elastically, and the tangents $T_1$ assume the position of the tangents $T_{11}$, which subtend a greater angle, e.g. an angle of approximately 120°. The tangents $T_{11}$ however tend to revert to their original position $T_1$. The fruit in the cell A is thereby gripped elastically in a direction parallel to the cell base 3. The horizontal gripping action is thus accomplished, expressed in other terms, by the fact that the top triangular rim of the cell is resiliently deformed into an approximate circle 11 during insertion of the fruit F and subsequently tends to revert to its original triangular form. As a result, the fruit F is gripped horizontally resiliently in the area of the sides 1 of the triangular plan form of the top cell rim, particularly in the area of the webs or ridges 10. This horizontal gripping action is at the same time supported by the vertical gripping action, since the parts of the cell wall 4 above the plane P of the largest fruit cross-section C, particularly in the region of the webs or ridges 10, equally bear with close contact against the surface of the fruit owing to their lower lateral bulge or transversal expansion, i.e., engaging over the widest fruit cross-section C.

This double gripping action, i.e., occurring in the vertical as well as horizontal direction, provides a reliable and gentle holding of the fruit in the corresponding supporting cell, that is to say also in the case of fruits differing substantially in size and shape from the normal size and form corresponding to the cell. The configuration of the cell, particularly of the rim of its top opening, simultaneously allows simple and effortless insertion and gripping of the fruit, without excessive application of pressure, and the tray may be produced by the suction mould process, even without counter rams.

Figure 8:
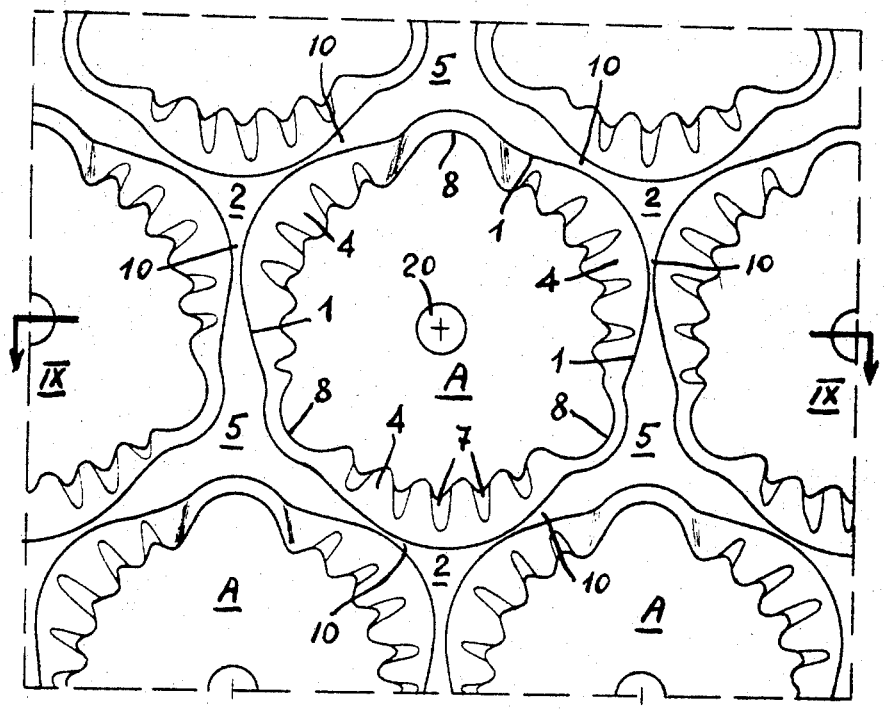
FIG. 8 shows a plan section of another embodiment of tray.

The form of tray in FIGS. 8 and 9 corresponds to that described with reference to FIGS. 4 to 7, identical parts being marked by the same references. In FIGS. 8 and 9 a relatively deep channel 8 is formed approximately vertically in the lateral cell wall 4 in the area of each saddle 5, which extends right to the cell base 3. The incorporation of these channels 8 substantially increases the elastic extensibility and deformability of the cell A in the transverse direction, so that the cells can adapt themselves better to the different shapes and sizes of the fruits inserted into them. The channels 8 moreover substantially improve ventilation of the lower portion of the fruit, as well as the vertical gripping action. The number and position of the vertical channels 8 may be chosen at will.

We claim:

1. A tray of cellular structure for packaging and transporting objects such as rounded fruit and made of thermoplastic foil approximately 0.1 to 0.3 mm. thick is characterised in that the inner top rim of each cell is approximately triangular in plan, each cell base is nontriangular in plan, and the cross-section of each cell parallel to its base changes gradually from an upper generally triangular shape to a lower shape corresponding to the shape of the base of the cell.

2. A tray according to claim 1 wherein the triangular portions of the cells have curved sides which are preferably outwardly convex, are shaped in at least the upper regions of the cells.

3. A tray according to claim 2 wherein the circle inscribing the corners of the generally upper triangular cell rim is of smaller diameter than the largest cross-sectional circle of an object to be packed in the cell.

4. A tray according to claim 2 wherein the triangular inner top rim of each cell has sides each forming an arc of a circle the centre of which is eccentric to the cell centre and the radius $R_1$ of which is greater than the radius $R_2$ of the largest cross sectional circle of an object to be packed in the cell, the ratio $R_2/R_1$ preferably being between 1.0 and 1.5.

5. A tray according to claim 2 wherein the curved sides of each cell are formed in a general shape selected from a cone frustrum and a ball cup made up of three partial areas extending over a sector of about 120° which merge into each other in the corner regions of the triangle, the radius of each partial area being preferably greater than the radius of the largest cross-sectional circle of an object to be packed into the cell.

6. A tray according to claim 1 wherein the cells form depressions in the tray and are surrounded by spaced humps disposed at the triangular cell corners of the top rims of the cells, the humps being generally frusto-pyramidal in shape.

7. A tray according to claim 6 wherein the elevation of each generally triangular upper cell rim is concavo-convex with a median downwardly curved saddle in each side and convexities merging into the humps and the ends of said triangular sides.

8. A tray according to claim 7 wherein three humps and three saddles are disposed alternately round each cell, each saddle is connected to the upper extremity of the same cell disposed ambilaterally thereto, and to the upper extremity of a hump of an adjacent cell by three hollow webs which diminish in height from the corresponding hump in the direction towards the saddle and have a width which correspondingly increases.

9. A tray according to claim 7 wherein each saddle is generally triangular in plan and is bounded by the sides of the generally triangular plan shape of the inner top rim of the three adjacent cells.

10. A tray according to claim 7 wherein the smallest height of the outer rim of each saddle is approximately the height of the plane containing the greatest cross section of an object packed in the cell.

11. A tray according to claim 8 wherein at least one of the upper hump extremity, the upper bounding wall of a saddle and the crest of the webs of a cell is reinforced by at least one portion selected from an outwardly directly curved portion and a wall portion of increased thickness.

References Cited

UNITED STATES PATENTS

| | | | |
|---|---|---|---|
| 3,049,259 | 8/1962 | Mazzi et al. | 229—42 X |
| 3,143,237 | 8/1964 | Weiss | 217—26.5 |
| 3,171,562 | 3/1965 | Weiss | 229—2.5 X |
| 3,224,569 | 12/1965 | Leitzel | 229—2.5 X |
| 3,262,786 | 7/1966 | Weiss | 229—2.5 X |
| 3,306,484 | 2/1967 | Padovani | 217—26.5 |

FOREIGN PATENTS

| | | |
|---|---|---|
| 94,278 | 4/1960 | Netherlands. |
| 102,879 | 10/1962 | Netherlands. |
| 1,053,857 | 1/1967 | Great Britain. |

DAVIS T. MOORHEAD, *Primary Examiner.*